United States Patent
Hung et al.

(10) Patent No.: US 11,698,690 B1
(45) Date of Patent: Jul. 11, 2023

(54) ACTIVE STYLUS AND TOUCH INPUT SYSTEM

(71) Applicant: ILI Technology Corp., Hsinchu County (TW)

(72) Inventors: Chia-Yu Hung, Hsinchu County (TW); Yi-Fan Lin, Hsinchu County (TW)

(73) Assignee: ILI Technology Corp., Hsinchu County (TW)

( * ) Notice: Subject to any disclaimer, the term of this patent is extended or adjusted under 35 U.S.C. 154(b) by 0 days.

(21) Appl. No.: 17/852,387

(22) Filed: Jun. 29, 2022

(51) Int. Cl.
*G06F 3/0354* (2013.01)
*G06F 3/041* (2006.01)

(52) U.S. Cl.
CPC ........ *G06F 3/03545* (2013.01); *G06F 3/0412* (2013.01)

(58) Field of Classification Search
CPC .............. G06F 3/03545; G06F 3/0412
See application file for complete search history.

(56) References Cited

U.S. PATENT DOCUMENTS

| | | | |
|---|---|---|---|
| 2017/0262084 A1* | 9/2017 | Qiao | H04W 4/80 |
| 2018/0164909 A1* | 6/2018 | Bae | G06F 3/04162 |
| 2020/0103988 A1* | 4/2020 | Jeon | G06F 3/04162 |
| 2021/0191590 A1* | 6/2021 | Jang | G06F 3/04162 |
| 2022/0057894 A1* | 2/2022 | Koike | G06F 3/0441 |

* cited by examiner

*Primary Examiner* — Peter D McLoone
(74) *Attorney, Agent, or Firm* — Winston Hsu

(57) ABSTRACT

An active stylus includes a memory; a transmission module; and an active stylus controller, coupled to the memory and the transmission module. The active stylus controller controls the transmission module to periodically transmit a downlink beacon signal and a plurality of downlink signals so as to synchronize timing with a touch panel and transmit information. The downlink beacon signal is composed of a plurality of bit data and includes a preamble, stored in the memory, for synchronizing the timing; a digital data, for transmitting information from the active stylus to the touch panel; and a cyclic redundancy check, for executing an error check or an error correction for data. The touch panel is an in-cell/on-cell organic light-emitting diode (OLED) touch screen or an in-cell/on-cell liquid-crystal display (LCD) touch screen.

22 Claims, 9 Drawing Sheets

ACTIVE STYLUS AND TOUCH INPUT SYSTEM

BACKGROUND OF THE INVENTION

1. Field of the Invention

The present invention relates to an active stylus and a touch input system, and more particularly, to an active stylus and a touch input system suitable for an in-cell/on-cell organic light-emitting diode (OLED) touch screen.

2. Description of the Prior Art

Generally speaking, touch screens may be categorized into add-on type and in-cell/on-cell type. The in-cell/on-cell touch screen integrates the touch sensors directly into the panel structure of the displayer, has the advantages of thinness, high transmittance and simplified production chain, and has become the mainstream.

When the in-cell/on-cell touch screen is used with a stylus, the display function and the touch function have to use the thin-film electrodes of the in-cell/on-cell touch panel in a time-divisional manner. The traditional liquid crystal display (LCD) temporarily stops the display function and allows the touch function to control the thin-film electrodes, so as to use the thin-film electrodes in the time-divisional manner. However, the organic light-emitting diode (OLED) display may not stop the display function, such that it is almost impossible to meet the requirements of performing the display function and the touch function in the time-divisional manner. Moreover, the traditional in-cell/on-cell LCD touch screen regularly sends an uplink beacon signal by the touch panel controller, and the active stylus synchronizes timing with the touch panel according to the uplink beacon signal and further establishes two-way communication with the touch panel. However, if the uplink beacon signal is to be sent by the in-cell/on-cell OLED touch screen, the huge driving load may cause abnormal images or damage to the OLED element, so the uplink beacon signal may not be sent by the touch panel controller to communicate with the active stylus.

Nowadays, the use of OLED displays has become an increasing trend, and the active stylus has the characteristics of detecting pen pressure and pen tilt, which makes it closer to the usage behavior of traditional writing tools and therefore is very popular. Under this circumstance, how to make the in-cell/on-cell OLED touch screen be used with the active stylus has become one of the concerns in the industry.

SUMMARY OF THE INVENTION

Therefore, the present invention is to provide an active stylus and a touch input system suitable for an in-cell/on-cell OLED touch screen to improve the prior art.

The present invention provides an active stylus, which comprises a memory; a transmission module; and an active stylus controller, coupled to the memory and the transmission module. The active stylus controller controls the transmission module to periodically transmit a downlink beacon signal and a plurality of downlink signals so as to synchronize timing with a touch panel and transmit information. The downlink beacon signal is composed of a plurality of bit data and comprises a preamble, stored in the memory, for synchronizing the timing; a digital data, for transmitting information from the active stylus to the touch panel; and a cyclic redundancy check, for executing an error check or an error correction for data. The touch panel is an in-cell/on-cell organic light-emitting diode (OLED) touch screen or an in-cell/on-cell liquid-crystal display (LCD) touch screen.

The present invention provides a touch input system, which comprises an active stylus, configured to periodically transmit a downlink beacon signal and a plurality of downlink signals; and a touch panel, configured to receive the downlink beacon signal and the plurality of downlink signals so as to synchronize timing with the active stylus and analyze information transmitted by the active stylus. The touch panel comprises a memory; a receiving module; and a touch panel controller, coupled to the memory and the receiving module. The touch panel controller controls the receiving module to receiving the downlink beacon signal and the plurality of downlink signals, and the downlink beacon signal is composed of a plurality of bit data. The downlink beacon signal comprises a preamble, stored in the memory, for synchronizing the timing; a digital data, for transmitting information from the active stylus to the touch panel; and a cyclic redundancy check, for executing an error check or an error correction for data. The touch panel is an in-cell/on-cell organic light-emitting diode (OLED) touch screen or an in-cell/on-cell liquid-crystal display (LCD) touch screen.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Generally, while using an active stylus with an in-cell/on-cell touch panel, a touch panel controller periodically sends an uplink beacon signal and then the active stylus synchronizes the timing with the touch panel according to the uplink beacon signal so as to establish two-way communication therebetween. However, while using an active stylus with an in-cell/on-cell OLED touch panel, since the in-cell/on-cell OLED touch panel is unable to output the uplink beacon signal, the active stylus needs to send the downlink beacon signal to perform one-way communication with the touch panel. In this situation, a solution is to use an active stylus to send a single frequency as a signal for synchronization, which, however, takes a long time to complete synchronization and is prone to synchronization failure due to interference. Moreover, the downlink frequency and downlink timing of such active stylus are predetermined and may not be changed, so when the touch screen suffers interferences, the performance of the active stylus may also be affected at the same time. In this regard, the present invention provides a touch input system which is suitable for the in-cell/on-cell OLED touch screen and solves the problem of lack of flexibility while the active stylus transmits signals in one-way direction.

Figure 1:
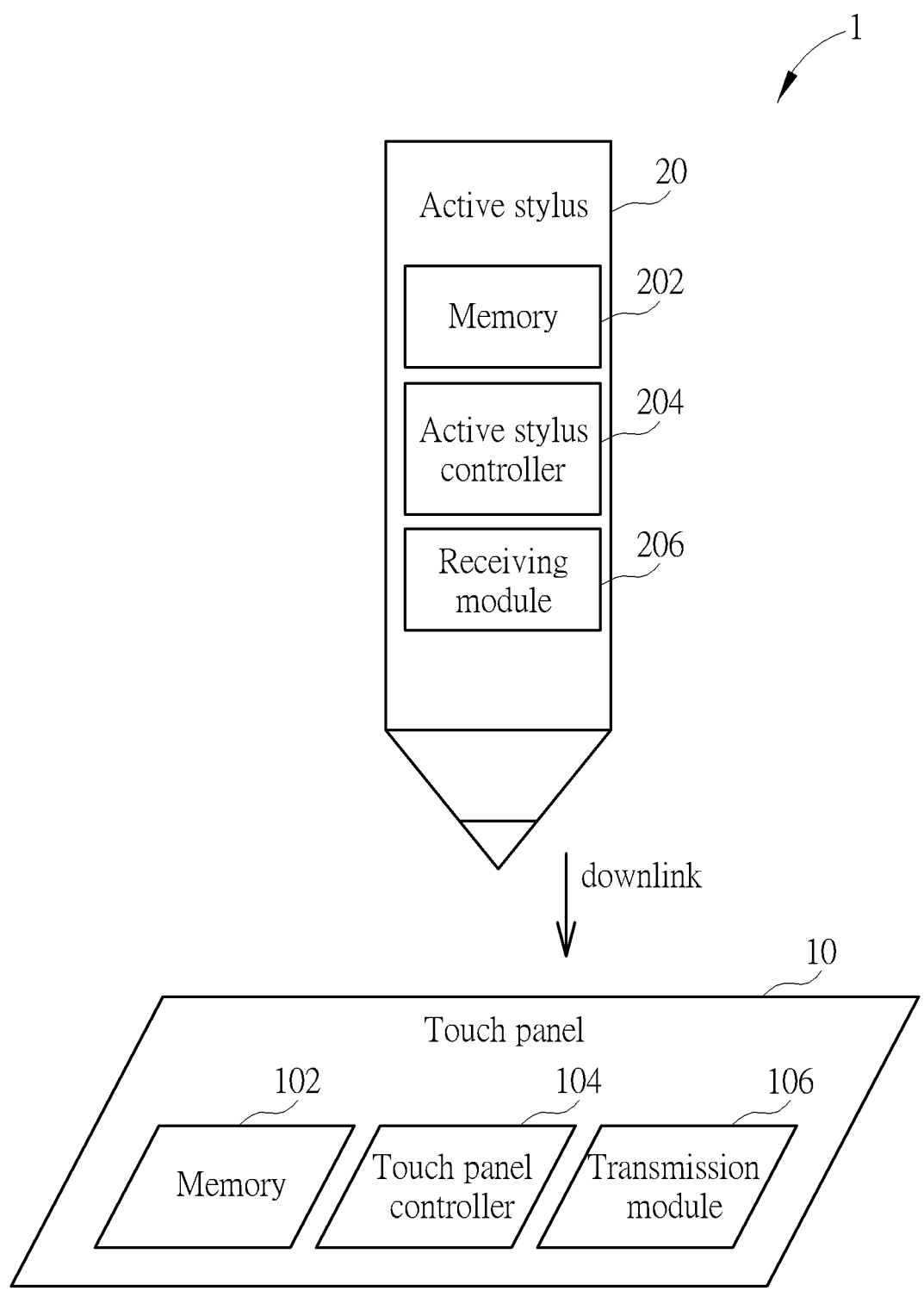
FIG. 1 is a schematic diagram of a touch input system according to an embodiment of the present invention.

Please refer to FIG. 1, which is a schematic diagram of a touch input system 1 according to an embodiment of the present invention. The touch input system 1 comprises a touch panel 10 and an active stylus 20. The touch panel 10 comprises a memory 102, a touch panel controller 104 and a receiving module 106, wherein the touch panel controller 104 is coupled to the memory 102 and the receiving module 106. The active stylus 20 comprises a memory 202, an active stylus controller 204 and a transmission module 206, wherein the active stylus controller 204 is coupled to the memory 202 and the transmission module 206. In order to perform one-way communication, while the active stylus 20 taps the touch panel 10, the active stylus 20 may periodically send a downlink beacon signal and a plurality of downlink signals to the touch panel 10. The downlink beacon signal is used to synchronize timing and convey commands, and the plurality of downlink signals are used for the touch panel 10 to sense a tip position of the active stylus 20. Note that, the touch input system 1 merely represents the necessary components to perform the one-way communication from the active stylus 20 to the touch panel 10 and synchronize the timing, and the basic structure thereof is well known in the art, which will not be repeated.

Figure 2:
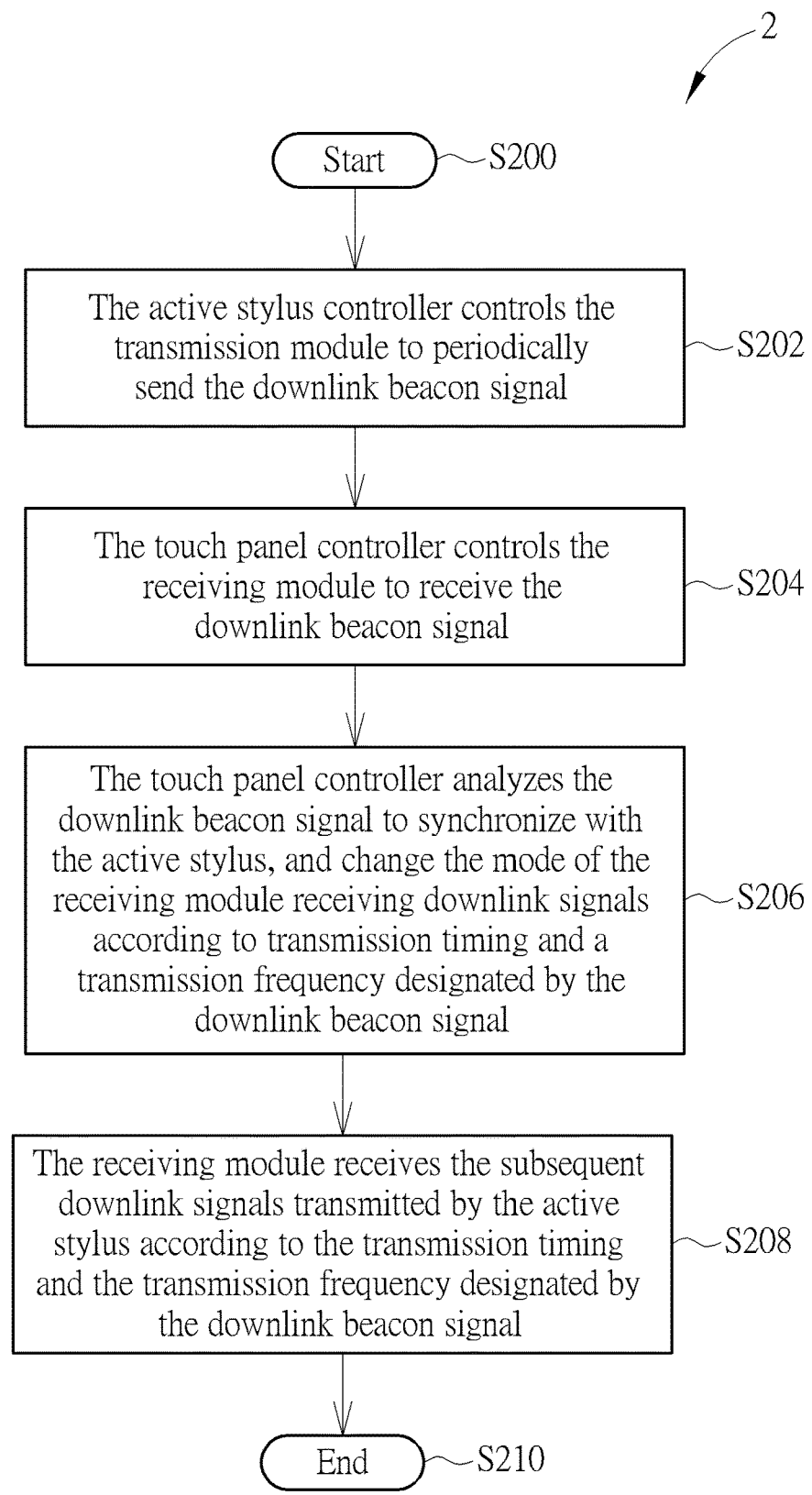
FIG. 2 is a flowchart of a method for one-way communication between an active stylus and a touch panel according to an embodiment of the present invention.

Specifically, the method for performing the one-way communication between the active stylus 20 and the touch panel 10 may be summarized into a process 2, as shown in FIG. 2. The process 2 comprises the following steps:

Step S200: Start.

Step S202: The active stylus controller 204 controls the transmission module 206 to periodically send the downlink beacon signal.

Step S204: The touch panel controller 104 controls the receiving module 106 to receive the downlink beacon signal.

Step S206: The touch panel controller 104 analyzes the downlink beacon signal to synchronize with the active stylus 20, and change the mode of the receiving module 106 receiving downlink signals according to transmission timing and a transmission frequency designated by the downlink beacon signal.

Step S208: The receiving module 106 receives the subsequent downlink signals transmitted by the active stylus 20 according to the transmission timing and the transmission frequency designated by the downlink beacon signal.

Step S210: End.

According to the process 2, in Step S202, the active stylus controller 204 periodically transmits the downlink beacon signal. The touch panel 10 first synchronizes timing with the active stylus 20 according to the downlink beacon signal, and then, the subsequent message transmission may be performed. In an embodiment of the present invention, the downlink beacon signal comprises a preamble, a digital data, and a cyclic redundancy check (CRC). The preamble is predetermined information stored in both of the memory 102 and the memory 202 for synchronizing the timing between the active stylus 20 and the touch panel 10; the digital data is utilized for message transmission between the active stylus 20 and the touch panel 10; the CRC is utilized for executing an error check and an error correction for data.

Next, in Step S204, the touch panel controller 104 controls the receiving module 106 to receive the downlink beacon signal, and in Step S206, the touch panel controller 104 analyzes the downlink beacon signal. According to the preamble of the downlink beacon signal, the touch panel 10 may synchronize the timing with the active stylus 20. According to the transmission timing and the transmission frequency designated in the digital data of the downlink beacon signal, the touch panel controller 104 may change the timing and the frequency for the receiving module 106 to receive the downlink signals. In Step S208, the receiving module 106 receives the downlink signals according to the transmission timing and the transmission frequency designated in the digital data of the downlink beacon signal. Accordingly, in the embodiment of the present invention, the active stylus 20 sends all signals unilaterally, while the touch panel 10 only receives and complies with the instructions given by the active stylus 20. In this case, the touch panel 10 may avoid sending uplink beacon signals and therefore be suitable for the in-cell/on-cell OLED touch screen.

In detail, the preamble of the downlink beacon signal is an agreed signal between the active stylus 20 and the touch panel 10, and may not be changed with other data. The preamble may be a single specific signal, a specific signal repeated multiple times, or a combination of multiple in-phases and anti-phases of a specific signal, and is not limited thereto. The touch panel controller 104 may calculate the correlation between the received signal and the preamble, so as to achieve timing synchronization. Moreover, the digital data of the downlink beacon signal may comprise data and commands sent by the active stylus 20; for example, the active stylus 20 may designate the frequency and timing of transmitting downlink signals. When the environmental noise or interference is detected, the active stylus controller 204 may change the transmission frequency of the transmission module 206, and notify the touch panel 10 through the digital data of the downlink beacon signal, and the touch panel controller 104 changes the receiving frequency of the receiving module 106 accordingly. In addition, the cyclic redundancy check of the downlink beacon signal is used to check the correctness of the transmission data, which is an output obtained by the active stylus controller 204 inputting the digital data of the downlink beacon signal into a predetermined hash function, and utilized for the touch panel 10 to check the correctness of the received signal. The cyclic redundancy check is a well-known technology to those skilled in the art, so it will not be narrated in detail.

Figure 3:
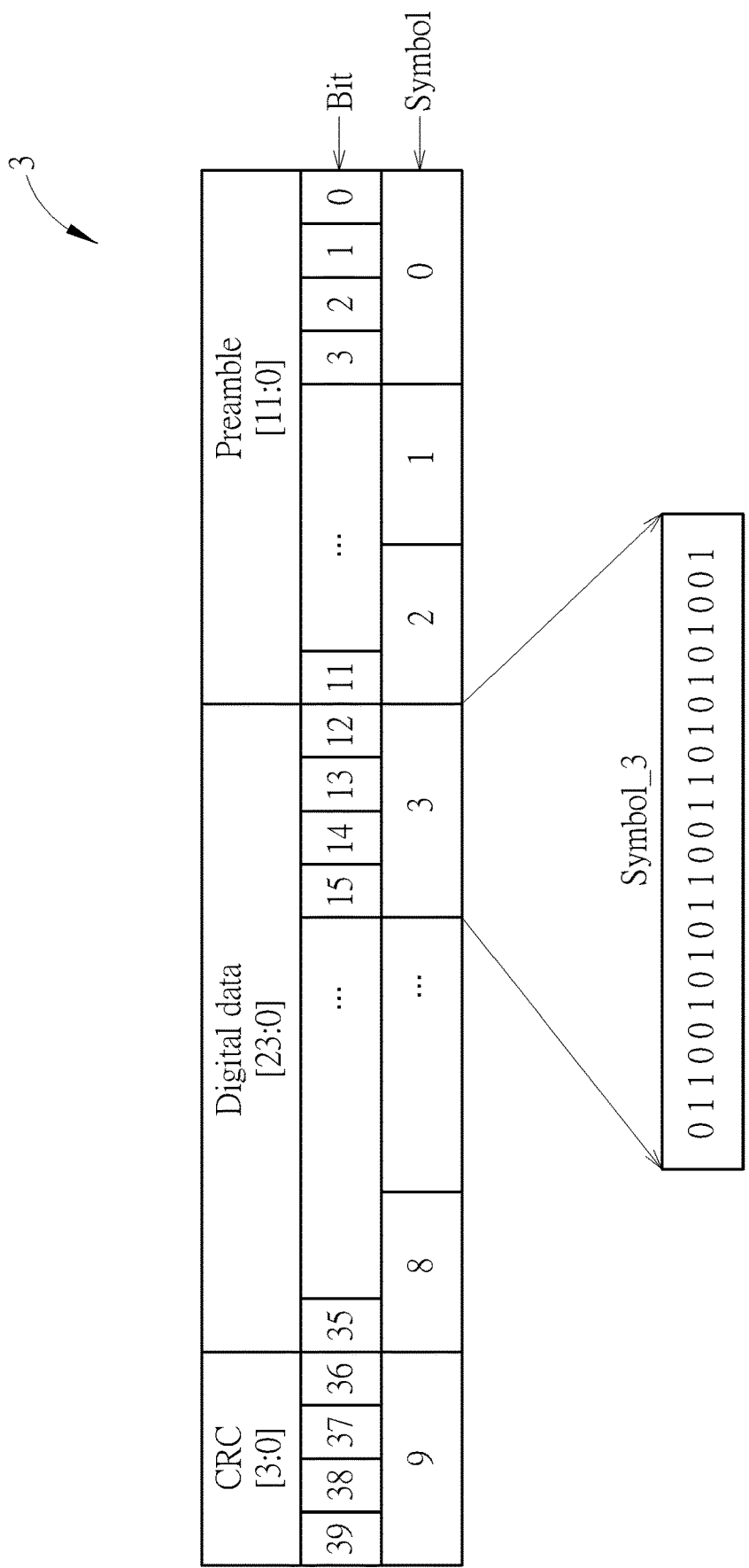
FIG. 3 is a schematic diagram of a beacon signal according to an embodiment of the present invention.

Furthermore, please refer to FIG. 3, which is a schematic diagram of a beacon signal 3. The preamble in the beacon signal 3 contains 12 bits of data, the digital data contains 24 bits of data, and the CRC contains 4 bits of data. That is, the beacon signal 3 contains 40 bits of data in total. In the prior art, each bit of data in the beacon signal 3 needs to be transmitted with a set of maximum length sequence code (MLS code) that is composed of a plurality of chips, and here 24 chips are used to transmit 1-bit data as an example. In general, each of the chips takes 1 microsecond (μs) to transmit, meaning that the set of MLS codes takes 24 microseconds to transmit. In this method, the beacon signal 3 containing 40-bit data will take 960 microseconds (μs) to transmit. However, the active stylus not only sends the downlink beacon signal but also needs to periodically send the downlink signals for position sensing or with information such as pressure values. On the other hand, the touch panel needs to detect not only the tip position of the active stylus but also the finger touching. In this situation, the prior art has the issue of low signal-to-noise ratio (SNR) in addition to taking too long to transmit the beacon signal.

In order to improve the time-consuming issue of transmitting the beacon signal in the prior art, the present invention modulates the plurality of bit data of the beacon signal into a plurality of symbols, and transmits the plurality of symbols by the direct-sequence spread spectrum (DSSS) technology with a plurality of pseudo noise (PN) codes to solve the above issue. The PN code may be a maximum length sequence code (MLS code), a Barker code, or a nested Barker code, etc., but is not limited thereto.

In detail, please continue to refer to FIG. 3. The active stylus controller 204 modulates the 12-bit data of the preamble into 3 symbols, the 24-bit data of the digital data into 6 symbols, and the 4-bit data of the CRC into 1 symbol. In other words, the active stylus controller 204 modulates every 4-bit data into 1 symbol. Therefore, the beacon signal 3 containing 40-bit data may be modulated to 10 symbols. The active stylus controller 204 then transmits the 10 symbols by the DSSS technology with 10 PN codes. In addition, each of the symbols in the beacon signal 3 is transmitted by a set of the MLS codes composed of 24 chips. For example, a symbol Symbol 3 is {−1, 1, 1, −1, −1, 1, −1, 1, −1, 1, 1, −1, −1, 1, 1, −1, 1, −1, 1, −1, 1, −1, −1, 1}. In general, each chip takes 1 microsecond to transmit, which means that the set of MLS codes takes 24 microseconds to transmit. In this embodiment, the beacon signal 3 composed of 10 symbols will take 240 microseconds to transmit, thereby greatly reducing the transmission time of the beacon signal.

Please refer to Table 1 below, which is a method of modulating the plurality of bit data of the beacon signal into the plurality of symbols. Table 1 is a codebook for implementing the embodiment of the present invention, wherein every symbol represents 4 bits of data and is transmitted by an MLS code of length 24. The first column of Table 1, {Preamble_P, Preamble_N, Data_0, Data_1, . . . , Data_F}, is the representation of the symbols, the second column is the 4-bit data represented by the symbols, and the third column is the MLS codes corresponding to the symbols.

TABLE 1

| Symbol Name | Bit data | MLS Codes |
|---|---|---|
| Preamble_P | — | 0x59A9A5 |
| Preamble_N | — | 0xA6565A |
| Data_0 | 0000 | 0x65AA56 |
| Data_1 | 0001 | 0x569A99 |
| Data_2 | 0010 | 0x9A9956 |
| Data_3 | 0011 | 0x6695A6 |
| Data_4 | 0100 | 0xA59969 |
| Data_5 | 0101 | 0x59966A |
| Data_6 | 0110 | 0x96A665 |
| Data_7 | 0111 | 0xA99695 |

TABLE 1-continued

| Symbol Name | Bit data | MLS Codes |
|---|---|---|
| Data_8 | 1000 | 0x9A55A9 |
| Data_9 | 1001 | 0xA96566 |
| Data_A | 1010 | 0x6566A9 |
| Data_B | 1011 | 0x996A59 |
| Data_C | 1100 | 0x5A6696 |
| Data_D | 1101 | 0xA66995 |
| Data_E | 1110 | 0x69599A |
| Data_F | 1111 | 0x56696A |

Figure 4:
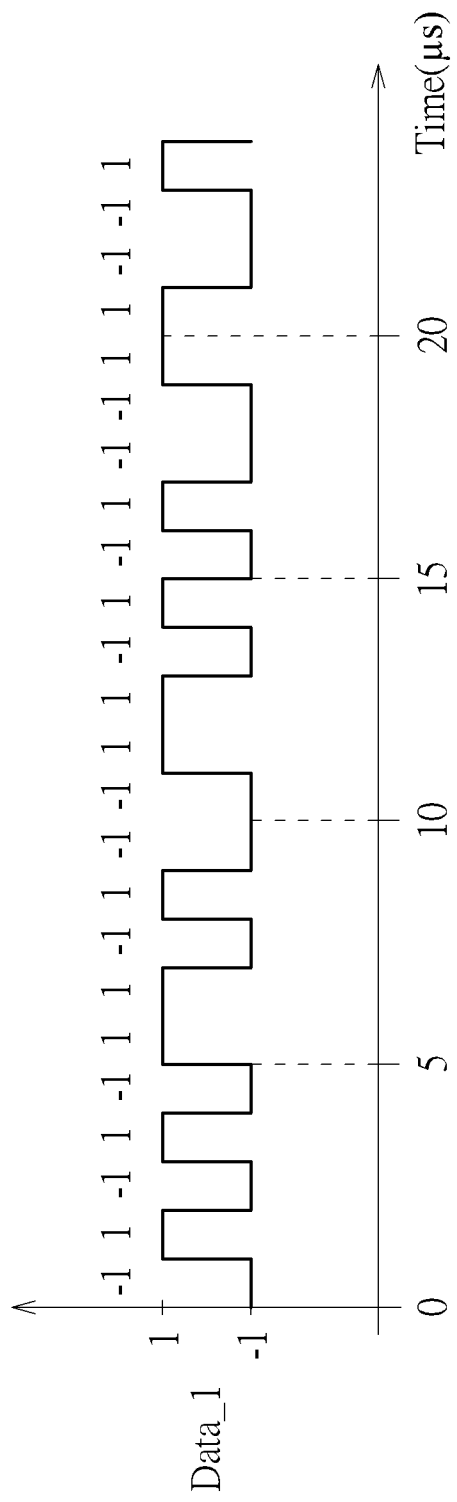
FIG. 4 is a schematic diagram of a waveform of a maximum length sequence code according to an embodiment of the present invention.

In detail, for example, the MLS code of 0x569A99 corresponding to Data_1 is a shorthand or brief for {−1, 1, −1, 1, −1, 1, 1, −1, 1, −1, −1, 1, 1, −1, 1, −1, 1, −1, −1, 1, 1, −1, −1, 1}, where each number represents a chip, −1 represents low potential and 1 represents high potential. The waveform of Data_1 is shown in FIG. 4. It should be noted that, in this embodiment, the MLS codes corresponding to the symbols Data_0 to Data_7 have low correlations or orthogonal zero correlation with each other; the MLS codes corresponding to the symbols Data_8 to Data_F are the reverse phases of the MLS codes corresponding to Data_0 to Data_7, and are highly negatively correlated with each other; the MLS codes corresponding to the symbols Data_8 to Data_F have low correlations or orthogonal zero correlation with each other. In addition, Preamble_P and Preamble_N are the MLS codes used for synchronization in the preamble, and have low correlation or orthogonal zero correlation with the MLS codes of the symbol Data_0 to Data_F. However, in this embodiment, the MLS codes corresponding to the symbols are not limited to this, and may also be designed to have low correlation or orthogonal zero correlation with each other. Those with ordinary skill in the art should readily adjust and modify according to the requirements.

Note that, in the above embodiment, the preamble of the beacon signal 3 contains 12 bits of data, the digital data contains 24 bits of data, and the CRC contains 4 bits of data, but is not limited thereto. In general, the preamble should contain at least 2 bits of data, the digital data should contain at least 1 bit of data, the CRC should contain at least 1 bit of data, and a beacon signal should contain at least 4 bits of data. Those skilled in the art may adjust the number of bits required by the beacon signal according to actual requirements. Moreover, the above embodiment takes the example that modulates each 4-bit data of the beacon signal into 1 symbol and transmits each symbol with a set of MLS codes composed of 24 chips, but is not limited to this. The number of bits represented by each symbol of the beacon signal and the length of the PN code corresponding to each symbol may be adjusted according to the requirements. The length of the PN codes used in the preamble of the beacon signal may also be different from the PN codes used in the digital data and in the CRC of the beacon signal. More specifically, the beacon signal of the present invention is composed of a plurality of chips, and the plurality of chips may be further divided into a plurality of PN codes. The plurality of PN codes corresponds to a plurality of symbol, and each symbol contains a plurality of bits. A ratio of an amount of chips included in each symbol of the preamble to an amount of bits included in each symbol of the preamble is not greater than 12, and a ratio of an amount of chips included in each symbol of the digital data and the cyclic redundancy check to an amount of bits included in the digital data and the cyclic redundancy check is not greater than 12. The lower the above ratio is, the higher the efficiency of data transmission is. However, when the number of chips used by the PN code is low, the ability to resist single-frequency noise interference is also weak, so an appropriate adjustment is needed.

Moreover, the downlink beacon signal sent by the active stylus 20 may not only be used to synchronize with the touch panel 10 through the preamble, but may also be used to transmit data through the digital data. The digital data transmitted by the active stylus 20 to the touch panel 10 may include the transmission timing, time slot and frequency of the downlink signals designated by the active stylus 20, and the touch panel 10 may receive the downlink signals accordingly. Furthermore, the digital data may also include a color designated by the active stylus 20, and a pressure value, a tilt, a battery level and a button status sensed by the active stylus 20.

Figure 5:
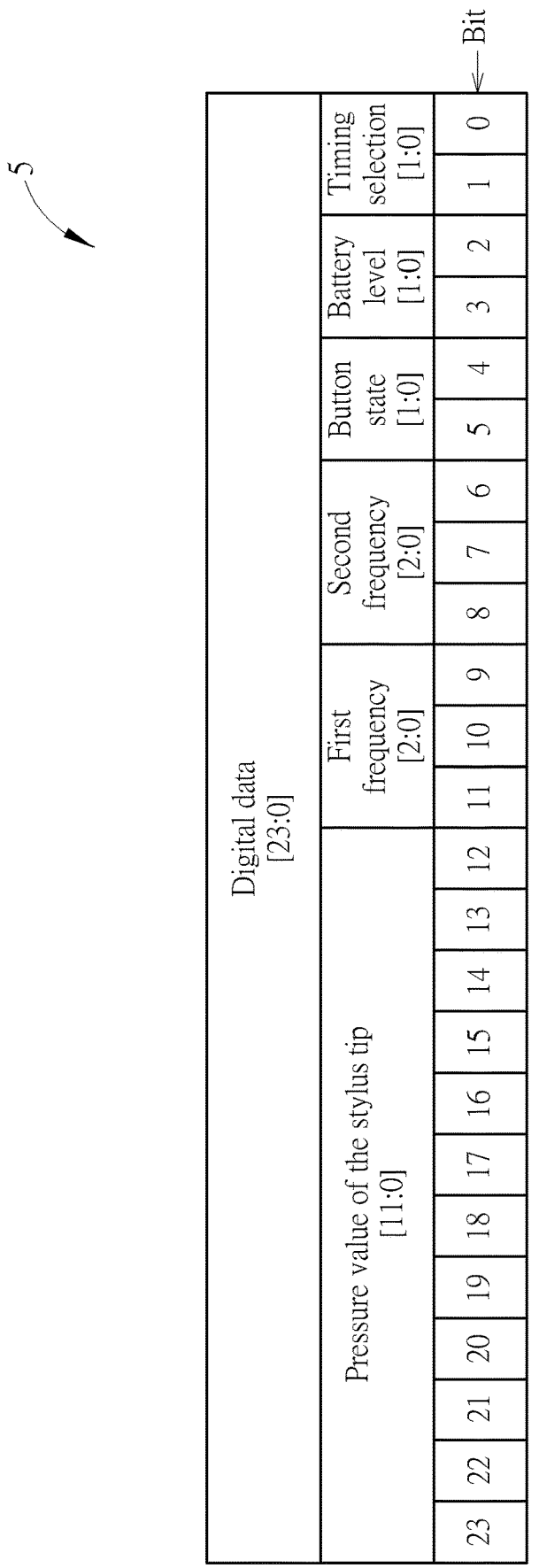
FIG. 5 and FIG. 6 are schematic diagrams of digital data in a downlink beacon signal according to embodiments of the present invention.
Figure 6:
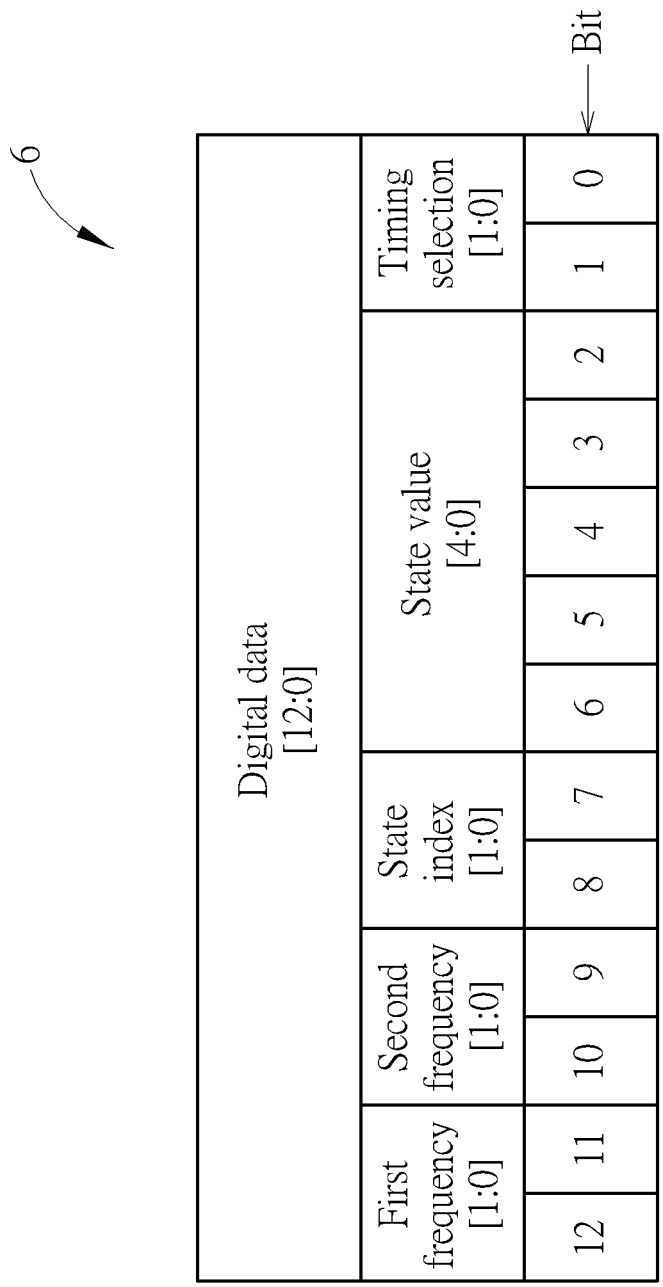

Please refer to FIG. 5, which is a schematic diagram of a digital data 5 of the downlink beacon signal according to an embodiment of the present invention. The digital data 5 contains 24-bit data, including 12-bit pressure value of the stylus tip, 3-bit first frequency, 3-bit second frequency, 2-bit button state, 2-bit battery level, and 2-bit timing selection. Please refer to FIG. 6, which is a schematic diagram of a digital data 6 of the downlink beacon signal according to an embodiment of the present invention. The digital data 6 contains 13-bit data, including 2-bit first frequency, 2-bit second frequency, 2-bit state index, 5-bit state value, and 2-bit timing selection. The 5-bit status value stores different types of data corresponding to the 2-bit status index. For example, when the value of the state index is 0, the state value may represent the battery level; when the value of the state index is 1, the state value may represent the button state; when the value of the state index is 2, the state value may represent the color. It should be noted that different types of active stylus have different functions and performances. For example, an active stylus with pressure sensing may have different sensing capabilities and provide different levels of pressure information, and some active styluses further have different functions such as tilt sensing. The digital data 5 and the digital data 6 of the present invention are merely used to describe the spirit thereof. Those skilled in the field should make different adjustments according to actual requirements, not limited to this. On the other hand, some content contained in the digital data of the downlink beacon signal sent by the active stylus 20 may also be transmitted to the touch panel 10 through a Bluetooth device, but this method will undoubtedly increase the cost. In contrast, the present invention modulates the plurality of bit data into the plurality of symbols so that the transmission capacity of the downlink beacon signal may be increased in a limited time. Therefore, in addition to the function of synchronization, the downlink beacon signal may also replace the Bluetooth device to transmit data.

Figure 7:
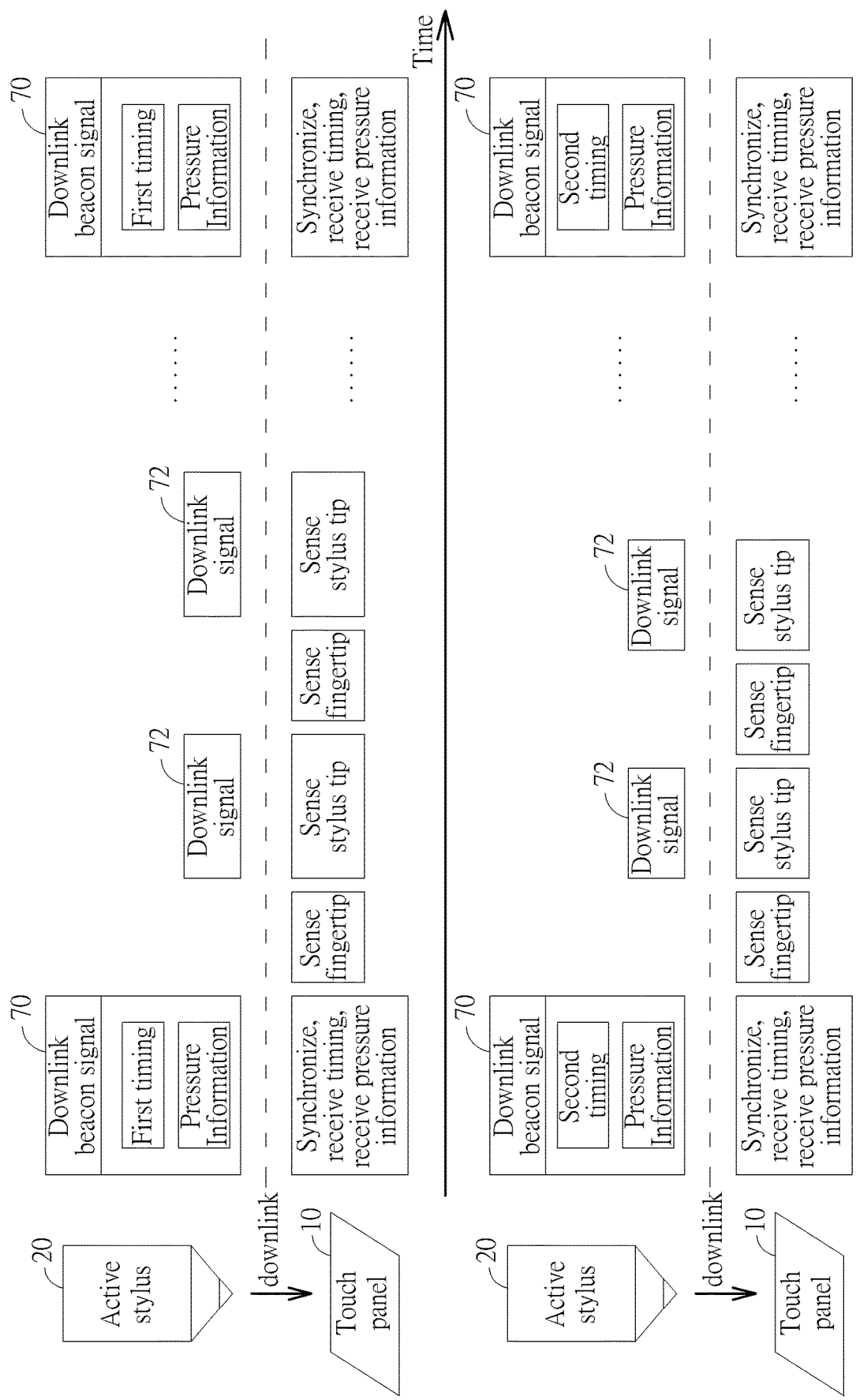
FIG. 7 to FIG. 9 are schematic diagrams of the active stylus performing one-way communication with the touch panel according to two different timings according to embodiments of the present invention.

Please refer to FIG. 7, which is a schematic diagram of the active stylus 20 performing one-way communication to the touch panel 10 according to two different timings in an embodiment of the present invention. The active stylus 20 periodically sends a downlink beacon signal 70 and a plurality of downlink signals 72 to the touch panel 10. The downlink beacon signal 70 contains a preamble, a digital data, and a CRC, and, for the sake of brevity, only a part of the content contained in the digital data is shown. The digital data of the downlink beacon signal 70 includes timing information and pressure information. After receiving the downlink beacon signal 70, the touch panel 10 performs synchronization according to the preamble of the downlink beacon signal 70, and obtains the content of the digital data including the aforementioned timing information and pressure information. The timing information may be a first timing or a second timing, and the active stylus 20 sends the plurality of downlink signals 72 according to the first timing or the second timing. On the other hand, the touch panel 10 receives the plurality of downlink signals 72 according to the received timing information (the first timing or the second timing). The touch panel 10 may sense the tip position of the active stylus 20 through the downlink signals 72, and the time slot other than the downlink signals 72 is used for fingertip sensing. As shown in FIG. 7, the touch input system 1 may transmit signals with different timings and different time slots according to different timing information (the first timing or the second timing).

Figure 8:
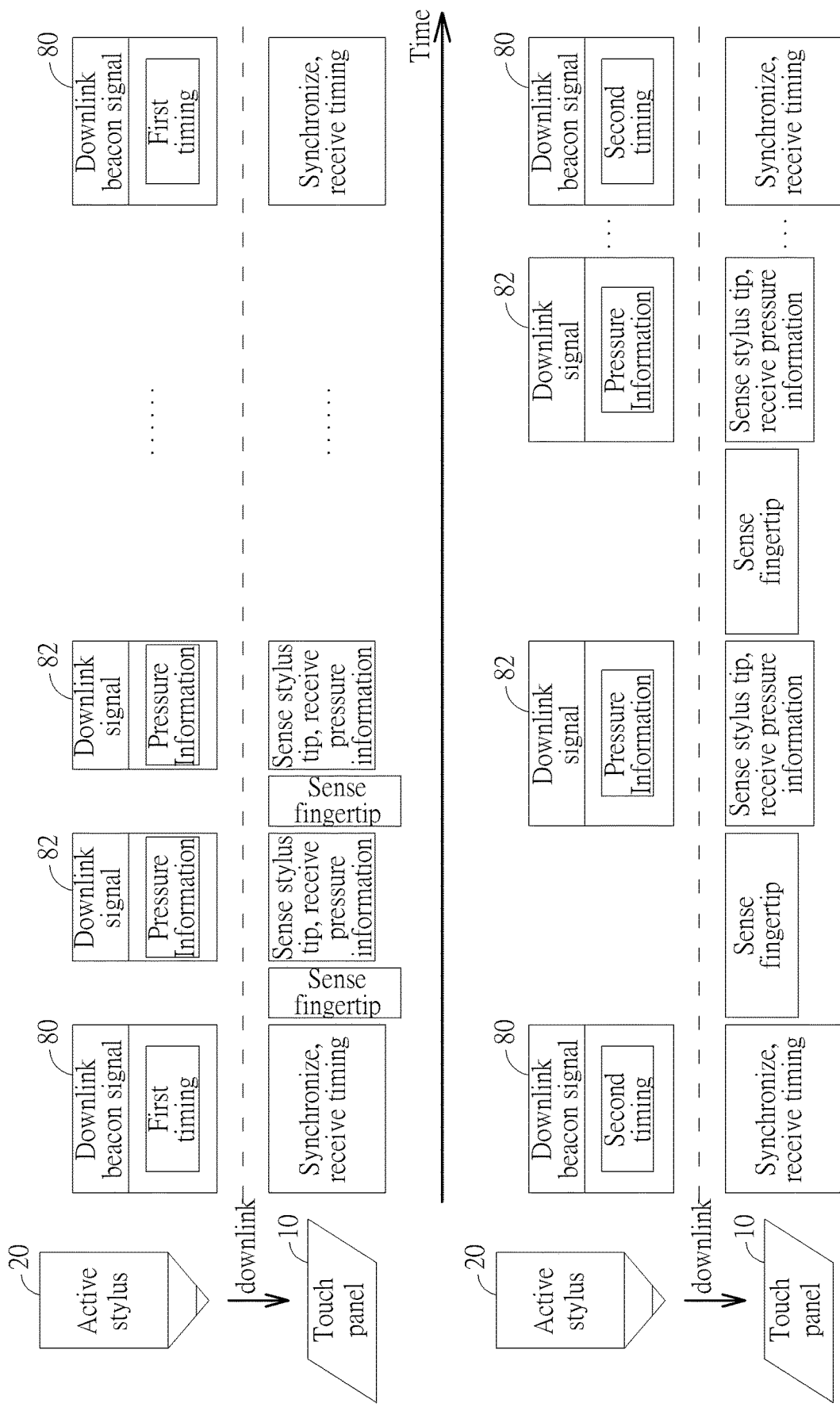

Please refer to FIG. 8, which is a schematic diagram of the active stylus 20 performing one-way communication to the touch panel 10 according to two different timings in another embodiment of the present invention. The active stylus 20 periodically sends a downlink beacon signal 80 and a plurality of downlink signals 82 to the touch panel 10. The downlink beacon signal 80 contains a preamble, a digital data, and a CRC, and, for the sake of brevity, only a part of the content contained in the digital data is shown. In this embodiment, the digital data of the downlink beacon signal 80 includes timing information but does not include pressure information. In contrast, the pressure information is transmitted through the downlink signals 82. After receiving the downlink beacon signal 80, the touch panel 10 performs synchronization according to the preamble of the downlink beacon signal 80, and obtains the content of the digital data including the aforementioned timing information. The timing information may be a first timing or a second timing, and the active stylus 20 sends the plurality of downlink signals 82 according to the first timing or the second timing. On the other hand, the touch panel 10 receives the plurality of downlink signals 82 according to the received timing information (the first timing or the second timing). The touch panel 10 may sense the tip position and the pressure information of the active stylus 20 through the downlink signals 82, and use the time slot other than the downlink signals 82 for fingertip sensing. As shown in FIG. 8, the touch input system 1 may transmit signals with different timings and different time slots according to different timing information (the first timing or the second timing), and may transmit data through the downlink beacon signal.

Figure 9:
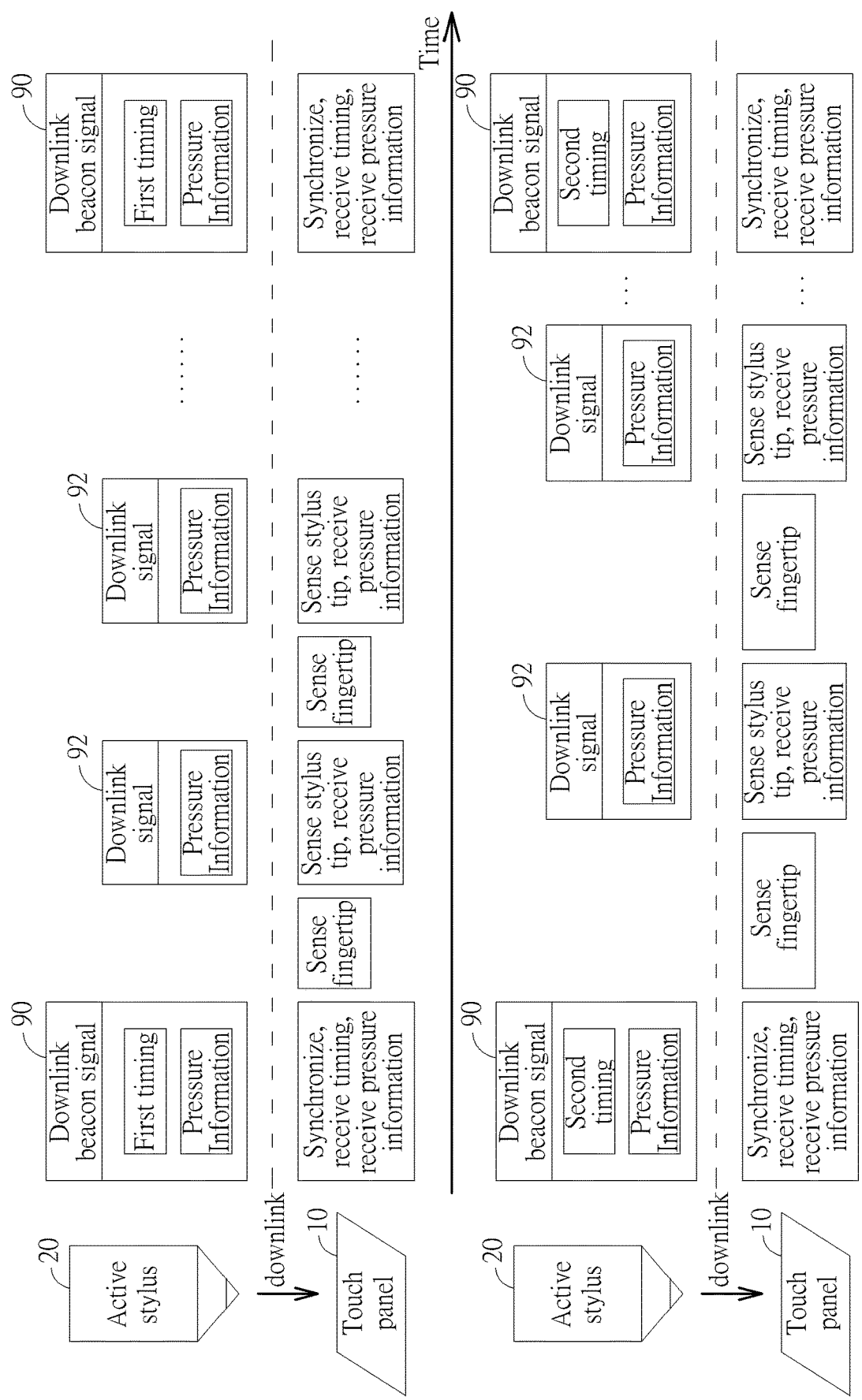

Please refer to FIG. 9, which is a schematic diagram of the active stylus 20 performing one-way communication to the touch panel 10 according to two different timings in another embodiment of the present invention. The active stylus 20 periodically sends a downlink beacon signal 90 and a plurality of downlink signals 92 to the touch panel 10. The downlink beacon signal 90 contains a preamble, a digital data, and a CRC, and, for the sake of brevity, only a part of the content contained in the digital data is shown. In this embodiment, the digital data of the downlink beacon signal 80 includes both timing information and pressure information, and the pressure information is also transmitted through the downlink signals 92 at the same time. After receiving the downlink beacon signal 90, the touch panel 10 performs synchronization according to the preamble of the downlink beacon signal 90, and obtains the content of the digital data including the aforementioned timing information and pressure information. The timing information may be a first timing or a second timing, and the active stylus 20 sends the plurality of downlink signals 92 according to the first timing or the second timing. On the other hand, the touch panel 10 receives the plurality of downlink signals 92 according to the received timing information (the first timing or the second timing). The touch panel 10 may sense the tip position and receive the pressure information of the active stylus 20 through the downlink signals 92, and use the time slot other than the downlink signals 92 for fingertip sensing. As can be known from FIG. 7 to FIG. 9, the touch input system 1 may transmit signals according to different timings and different policies, and may flexibly transmit data through the downlink beacon signal and downlink signals.

The in-cell/on-cell OLED touch screen is not suitable for sending the uplink beacon signal, and the time available for touching sensing is extremely limited in order for the OLED panel to display continuously. In this situation, the present invention enhances the data transmission speed of the downlink beacon signal by modulating the plurality of bit data of the downlink beacon signal into the plurality of symbols, so that the touch panel may receive the required information within a limited time. In addition, by transmitting different timing information through the downlink beacon signal, the command of timing change could be transmitted more effectively, which solves the problem of low flexibility of one-way communication with the active stylus in the prior art.

Note that, the touch input system 1 is the embodiment of the present invention, and those skilled in the art may readily make combinations, modifications and/or alterations on the abovementioned description and examples. The abovementioned description, steps, procedures and/or processes including suggested steps can be realized by means that could be hardware, software, firmware (known as a combination of a hardware device and computer instructions and data that reside as read-only software on the hardware device), an electronic system, or combination thereof. Examples of hardware can include analog, digital and mixed circuits known as microcircuit, microchip, or silicon chip. Examples of the electronic system may include a system on chip (SoC), system in package (SiP), and a computer on module (CoM). The procedures and examples above may be compiled into program codes or instructions that stored in the memory 102 and the memory 202. The memory 102 and the memory 202 may be a computer-readable storage medium, including read-only memory (ROM), flash memory, random access memory (RAM), subscriber identity module (SIM), but not limited thereto.

In summary, compared to the prior art where the touch panel sends an uplink beacon signal to synchronize with an active stylus and perform two-way communication, the present invention sends the downlink beacon signal from the active stylus to the touch panel so as to synchronize timing and perform one-way data transmission. Accordingly, the touch panel avoids outputting the uplink beacon signal with a high voltage, so that the in-cell/on-cell OLED touch screen may be used with the active stylus. In addition, the present invention enhances the data transmission efficiency of the beacon signal by modulating the plurality of bit data of the beacon signal into the plurality of symbols, so that in addition to synchronization, the beacon signal is also utilized for transmitting data. Moreover, the data sent with the beacon signal may be transmitted by the DSSS technique with the plurality of PN codes, and thus has anti-interference ability. Furthermore, considering environmental noise interference, the active stylus may change a signal transmission frequency and notify the touch panel to change a reception frequency to avoid affecting performance. Therefore, the active stylus of the present invention has a high degree of operational flexibility.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An active stylus, comprising:
   a memory;
   a transmission module; and
   an active stylus controller, coupled to the memory and the transmission module;
   wherein the active stylus controller controls the transmission module to periodically transmit a downlink beacon signal and a plurality of downlink signals so as to synchronize timing with a touch panel and transmit information, wherein the downlink beacon signal is composed of a plurality of bit data and comprises:
      a preamble, stored in the memory, for synchronizing the timing;
      a digital data, for transmitting information from the active stylus to the touch panel; and
      a cyclic redundancy check, for executing an error check or an error correction for data;
   wherein the touch panel is an in-cell/on-cell organic light-emitting diode (OLED) touch screen or an in-cell/on-cell liquid-crystal display (LCD) touch screen;
   wherein the plurality of bit data of the downlink beacon signal are modulated into a plurality of symbols to be transmitted by a direct-sequence spread spectrum (DSSS) technology with a plurality of pseudo noise code (PN code).

2. The active stylus of claim 1, wherein the active stylus does not receive any uplink beacon signal.

3. The active stylus of claim 1, wherein the touch panel does not transmit any uplink beacon signal.

4. The active stylus of claim 1, wherein the plurality of bit data of the downlink beacon signal comprises at least four bits of data, the preamble comprises at least two bits of data, the digital data comprises at least one bit of data, and the cyclic redundancy check comprises at least one bit of data.

5. The active stylus of claim 1, wherein the digital data of the downlink beacon signal comprises a transmission time sequence, a transmission time slot and a transmission frequency designated by the active stylus, and the active stylus receives the plurality of downlink signals accordingly.

6. The active stylus of claim 1, wherein the digital data of the downlink beacon signal comprises one or more of a color designated by the active stylus, and a tilt, a pressure value, a battery level and a button status sensed by the active stylus.

7. The active stylus of claim 1, wherein the plurality of downlink signals comprise a pressure value sensed by the active stylus.

8. The active stylus of claim 1, wherein when the active stylus is disturbed by environmental noise, a transmission frequency is changed and the touch panel is notified with the downlink beacon signal to change a reception frequency.

9. The active stylus of claim 1, wherein a plurality of symbols of the preamble of the downlink beacon signal have a low correlation or an orthogonal zero correlation with a plurality of the symbols of the digital data thereof.

10. The active stylus of claim 1, wherein a plurality of symbols of the digital data of the downlink beacon signal have a low correlation or an orthogonal zero correlation.

11. The active stylus of claim 1, wherein symbols of a front half of a plurality of symbols of the digital data of the downlink beacon signal are low correlated or orthogonally zero correlated with each other, symbols of a back half thereof are low correlated or zero correlated with each other, and the symbols of the front half and the back half are highly negatively correlated.

12. A touch input system, comprising:
an active stylus, configured to periodically transmit a downlink beacon signal and a plurality of downlink signals; and
a touch panel, configured to receive the downlink beacon signal and the plurality of downlink signals so as to synchronize timing with the active stylus and analyze information transmitted by the active stylus, comprising:
a memory;
a receiving module; and
a touch panel controller, coupled to the memory and the receiving module;
wherein the touch panel controller controls the receiving module to receiving the downlink beacon signal and the plurality of downlink signals, and the downlink beacon signal is composed of a plurality of bit data and comprises:
a preamble, stored in the memory, for synchronizing the timing;
a digital data, for transmitting information from the active stylus to the touch panel; and
a cyclic redundancy check, for executing an error check or an error correction for data;
wherein the touch panel is an in-cell/on-cell organic light-emitting diode (OLED) touch screen or an in-cell/on-cell liquid-crystal display (LCD) touch screen;
wherein the plurality of bit data of the downlink beacon signal are modulated into a plurality of symbols to be transmitted by a direct-sequence spread spectrum (DSSS) technology with a plurality of pseudo noise code (PN code).

13. The touch input system of claim 12, wherein the active stylus does not receive any uplink beacon signal.

14. The touch input system of claim 12, wherein the touch panel does not transmit any uplink beacon signal.

15. The touch input system of claim 12, wherein the plurality of bit data of the downlink beacon signal comprises at least four bits of data, the preamble comprises at least two bits of data, the digital data comprises at least one bit of data, and the cyclic redundancy check comprises at least one bit of data.

16. The touch input system of claim 12, wherein the digital data of the downlink beacon signal comprises a transmission time sequence, a transmission time slot and a transmission frequency designated by the active stylus, and the active stylus receives the plurality of downlink signals accordingly.

17. The touch input system of claim 12, wherein the digital data of the downlink beacon signal comprises one or more of a color designated by the active stylus, and a tilt, a pressure value, a battery level and a button status sensed by the active stylus.

18. The touch input system of claim 12, wherein the plurality of downlink signals comprise a pressure value sensed by the active stylus.

19. The touch input system of claim 12, wherein when the active stylus is disturbed by environmental noise, a transmission frequency is changed and the touch panel is notified with the downlink beacon signal to change a reception frequency.

20. The touch input system of claim 12, wherein a plurality of symbols of the preamble of the downlink beacon signal have a low correlation or an orthogonal zero correlation with a plurality of the symbols of the digital data thereof.

21. The touch input system of claim 12, wherein a plurality of symbols of the digital data of the downlink beacon signal have a low correlation or an orthogonal zero correlation.

22. The touch input system of claim 12, wherein symbols of a front half of a plurality of symbols of the digital data of the downlink beacon signal are low correlated or orthogonally zero correlated with each other, symbols of a back half thereof are low correlated or zero correlated with each other, and the symbols of the front half and the back half are highly negatively correlated.

* * * * *